(12) United States Patent
Deen et al.

(10) Patent No.: US 9,721,596 B2
(45) Date of Patent: Aug. 1, 2017

(54) DATA READER WITH RESONANT TUNNELING

(71) Applicant: Seagate Technology LLC, Cupertino, CA (US)

(72) Inventors: David A. Deen, Edina, MN (US); Thomas E. Dunn, Bloomington, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/633,898

(22) Filed: Feb. 27, 2015

(65) Prior Publication Data

US 2016/0254012 A1     Sep. 1, 2016

(51) Int. Cl.
     *G11B 5/39*     (2006.01)
(52) U.S. Cl.
     CPC ............ *G11B 5/3909* (2013.01); *G11B 5/398* (2013.01)
(58) Field of Classification Search
     None
     See application file for complete search history.

(56) References Cited

U.S. PATENT DOCUMENTS

| 5,636,093 | A | 6/1997 | Gijs et al. |
|---|---|---|---|
| 5,898,547 | A | 4/1999 | Fontana, Jr. et al. |
| 6,178,074 | B1 | 1/2001 | Gill |
| 6,381,171 | B1 * | 4/2002 | Inomata ................. H01L 43/08 257/E43.004 |
| 6,456,523 | B1 * | 9/2002 | Tanaka .................. B82Y 10/00 257/E27.005 |
| 6,606,781 | B1 | 8/2003 | Gill |
| 6,657,829 | B2 | 12/2003 | Nakazawa et al. |
| 6,967,366 | B2 | 11/2005 | Janesky et al. |
| 7,268,986 | B2 * | 9/2007 | Gill ........................ G11B 5/39 360/314 |
| 7,939,870 | B2 | 5/2011 | Wunderlich et al. |
| 8,315,009 | B2 | 11/2012 | Bumanlag et al. |
| 8,508,984 | B2 | 8/2013 | Ranjan et al. |
| 2012/0112299 | A1 | 5/2012 | Inomata et al. |

FOREIGN PATENT DOCUMENTS

| CN | 1601610 A | * | 3/2005 |
|---|---|---|---|
| JP | 10190014 A | * | 7/1998 |
| JP | 2000332317 A | * | 11/2000 |
| JP | 4076197 B2 | * | 4/2008 |

(Continued)

OTHER PUBLICATIONS

English-machine translation of JP4076197B2, published on Apr. 16, 2008.*

(Continued)

*Primary Examiner* — Will J Klimowicz
(74) *Attorney, Agent, or Firm* — Hall Estill Attorneys at Law (57) ABSTRACT

A data reader may have an resonant tunnel structure disposed between first and second magnetic structures. The resonant tunnel structure can be configured with a spacer layer disposed between first and second barrier layers. The first barrier layer can have a first thickness that is smaller than a second thickness of the second barrier layers with the thicknesses each measured along a common plane to provide resonant tunneling for the data reader.

20 Claims, 5 Drawing Sheets

(56) References Cited

FOREIGN PATENT DOCUMENTS

| JP | 5127360 B2 * | 1/2013 | ............... H03B 7/08 |
| JP | 5310528 B2 * | 10/2013 | |

OTHER PUBLICATIONS

English-machine translation of CN1601610A, published on Mar. 30, 2005.*

M. Chshiev, et al., "Magnetic diode effect in double-barrier tunnel junctions," Europhysics Letters, Apr. 15, 2002, pp. 257-263, 58 (2), EDP Sciences.

S Colis, et al., "Low tunnel magnetoresistance dependence versus bias voltage in double barrier magnetic tunnel junction," Applied Physics Letters, Aug. 4, 2003, pp. 948-949, vol. 83, No. 5, American Institute of Physics.

G. Feng, et al., "Annealing of CoFeB/MgO based single and double barrier magnetic tunnel junctions: Tunnel magnetoresistance, bias dependence, and output voltage," Journal of Applied Physics, 2009, pp. 1-7, 105 033916, American Institute of Physics.

Z. M. Zeng, et al., "Bias voltage and temperature dependence of magneto-electric properties in double-barrier magnetic tunnel junction with amorphous Co—Fe—B electrodes," The European Physical Journal B, 2006, pp. 205-208.

Xiangdong Zhang, et al., "Spin-polarized tunneling and magnetoresistance in ferromagnet/insulator (semiconductor) single and double tunnel junctions subjected to an electric field," Physical Review B, Sep. 1, 1997, pp. 5484-5488, The American Physical Society.

Xie Zheng-Wei, et al., "The effect of the ferromagnetic metal layer on tunnelling conductance and magnetoresistance in double magnet planar junctions," Chinese Physics, Oct. 2002, pp. 1060-1065, vol. 11, No. 10, Chinese Physical Society & IOP Publishing, Ltd.

Gen Feng, et al., Influence of annealing on the bias voltage dependence of tunneling magnetoresistance in MgO double-barrier magnetic tunnel junctions with CoFe electrodes, Applied Physics Letters, 2006, pp. 1-3, 89 162501, American Institute of Physics.

S. Mathi Jaya, et al., "Resonant tunnel magnetoresistance in double-barrier magnetic tunnel junctions: A non-equilibrium Green's function study," A Letters Journal Exploring the Frontiers of Physics, Jun. 2013, pp. 1-6, 102 57006, EPL Journal.

L. X. Jiang, et al., "Magnetotransport properties of CoFeB/MgO/CoFe/MgO/CoFeB double barrier magnetic tunnel junctions with large negative magnetoresistance at room temperature," Journal of Physics: Conference Series, 2010, pp. 1-4, 200 052009, IOP Publishing.

R. S. Liu, et al., "CoFe alloy as middle layer for strong spin dependent quantum well resonant tunneling in MgO double barrier magnetic tunnel junctions," Physical Review, 2013, pp. 1-5, 87 024411, The American Physical Society.

Nobuya Machida, et al., "Analysis of Phase Breaking Effect in Triple-Barrier Resonant-Tunneling Diodes," 1998, pp. 160-162, IEEE.

L. D. Macks, et al., "Resonant tunneling in double-quantum-well triple-barrier heterostructures," Physical Review B, Aug. 15, 1996, pp. 4857-4862, vol. 54, No. 7, The American Physical Society.

Hiroshi Naganuma, et al., Retraction: "Large Tunnel Magnetoresistance of 1056% at Room Temperature in MgO Based Double Barrier Magnetic Tunnel Junction," Applied Physics Express, 2011, pp. 1-3, 4 019201, The Japan Society of Applied Physics.

J Peralta-Ramos, et al., "I-V curves of Fe/MgO (001) single- and double-barrier tunnel junctions," Physical Review B, 2008, pp. 1-5, 78 024430, The American Physical Society.

V. I. Savichev, et al., "Quantum load matching," Europhysics Letters, Jan. 1, 2003, pp. 1-7, 61 (1), EDP Sciences.

L. Sheng, et al., "Nonlinear transport in tunnel magnetoresistance systems," Physical Review B, Jan. 1, 1999, pp. 480-485, vol. 59, No. 1, The American Physical Society.

J. M. Teixeira, et al., "Resonant Tunnelingi through Electronic Trapping States in Thin MgO Magnetic Junctions," Physical Review Letters, May 13, 2011, pp. 1-4, 106 196601, The American Physical Society.

* cited by examiner

DATA READER WITH RESONANT TUNNELING

SUMMARY

A data reader, in accordance with some embodiments, has resonant tunneling by employing an resonant tunnel structure disposed between first and second magnetic structures. The resonant tunnel structure is configured with a spacer layer disposed between first and second barrier layers that have different thicknesses measured along a common plane.

DETAILED DESCRIPTION

Data storage systems have progressed to have more data generation and data transfer capabilities as well as greater ability to interconnect to other devices. Increased volume of data being utilized by a computing device, such as a desktop computer, tablet, smartphone, and laptop computer, can stress the data storage capacity and data access speed of various data storage devices. The data bit density in a hard disk drive data storage device can be raised to accommodate greater data capacity for a given form factor, such as 3.5", but can correspond with higher numbers of data access errors due to data storage components not being sensitive enough to distinguish between closely positioned data bits. Hence, a data reading component that provides stable operation and increased performance by providing resonant tunneling magnetoresistance (TMR) is a continued industry and consumer goal.

Accordingly, a resonant tunnel structure can be incorporated into a data reader to provide resonant TMR through a quantum confined electronic state of a quantum well formed in the resonant tunnel structure. Various embodiments construct the resonant tunnel structure with a magnetic, or non-magnetic, spacer layer separating first and second magnetic barrier layers to provide a resonant magnetic tunnel junction that optimizes TMR due to the tuned resonance. Such a resonant tunnel structure can be utilized in a variety of applications that are not limited to magnetic data readers.

Through the tuning of materials and sizes of the constituent layers of the resonant tunnel structure, conductance and TMR can be optimized while providing a resistance area product that is tunable in-situ via voltage regulation. A tuned resonant tunnel structure can minimize TMR away from resonance and filter deviations in the data reader's resonant energy to intrinsically increase reader stability. Hence, utilization of an a resonant tunnel structure tuned for material, size, and resonance operation optimizes the performance of a data reader and consequently a data storage device.

Figure 1:
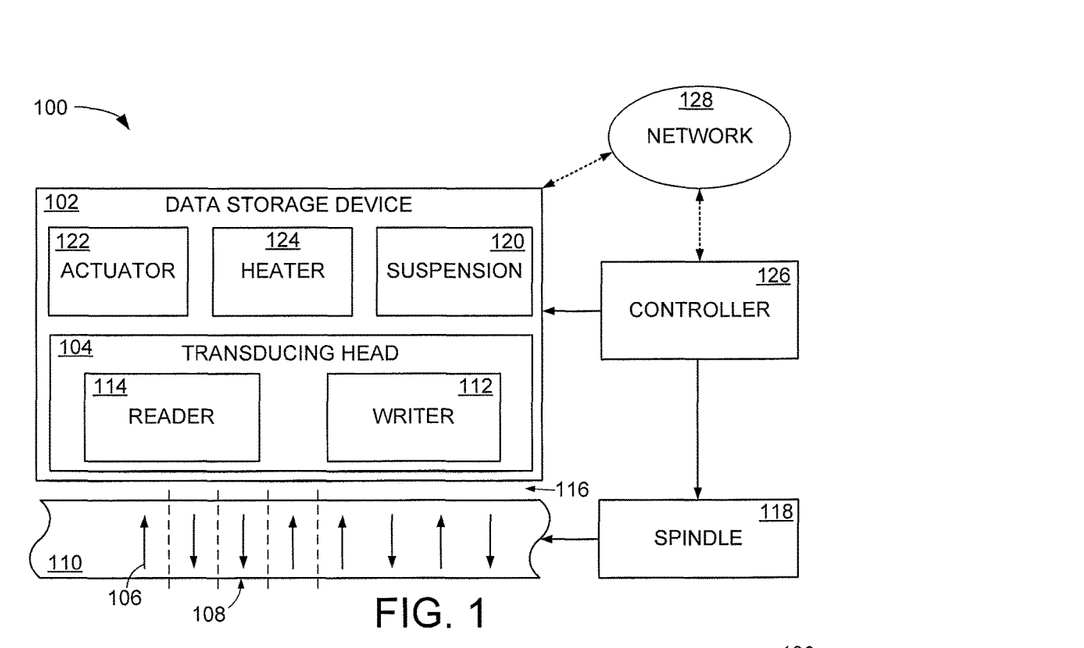
FIG. 1 is a block representation of an example data storage system configured and operated in accordance with some embodiments.

While a data reader employing an resonant tunnel structure can be utilized in an unlimited variety of environments and systems, FIG. 1 provides an example data storage system 100 in which a tuned data reader can be commissioned in accordance with some embodiments. Although not required or limiting, the data storage system 100 can have one or more data storage devices 102 that are configured with at least one data storage means. It is contemplated that various solid-state volatile and non-volatile memories can be used as data storage means.

Assorted embodiments arrange at least one data storage means of the data storage system 100 as a hard disk drive with at least one transducing head 104 accessing data bits 106 stored in patterned data tracks 108 on a data storage medium 110. The transducing head 104 can utilize one or more data writers 112 and data readers 114 to store data to and read data from the data storage medium 110. The transducing head 104 may float on an air bearing 116 generated by rotation of the data medium 110 by a spindle motor 118. Any number of components can be connected to the transducing head 104 to control the size of the air bearing 116. For instance, a suspension 120, such as a gimbal, can allow the transducing head 104 to pitch and roll in adaptation to changes induced by an actuator 122 and heater 124.

At least one controller 126 can be connected to the various aspects of the data storage system 100, as shown, to monitor, detect, and control the data storage environment to provide data access operations. A controller 126 can be local or remote, such as through a wired or wireless network 128, and may be utilized individually or collectively with other controlling means, such as processors, servers, hosts, nodes, and application specific integrated circuits (ASICs). With the air bearing 116 and data bit density being configured on a nanometer scale, the data reader 114 can have a small window of time and narrow band of data bit magnetization to sense.

Figure 2:
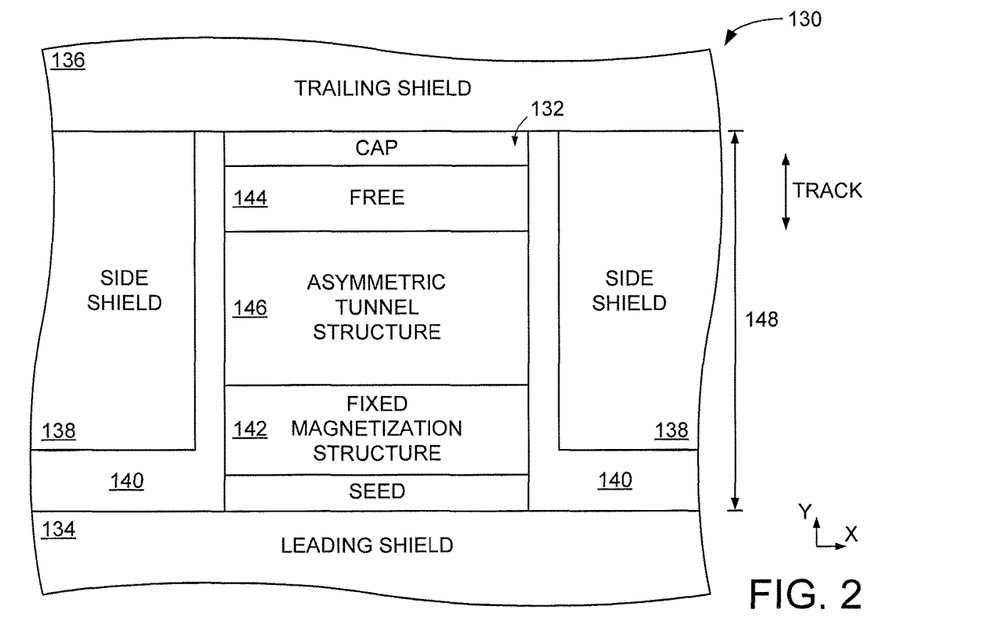
FIG. 2 displays a block representation of a portion of an example data reader capable of being used with the data storage system of FIG. 1.

FIG. 2 displays a block representation of a portion of an example data reader 130 that may be employed in the data storage system 100 of FIG. 1 to sense data on a nanometer scale. In accordance with assorted embodiments, the data reader 130 can have at least one magnetoresistive stack 132 disposed between leading 134 and trailing 136 shields as well as between side shields 138. It is noted that the terms "leading" and "trailing" are not limiting and are meant to denote relative position either down-track or up-track relative to a data track and the motion of the data reader 130.

The magnetoresistive stack 132 can be separated from the side shields 138 by lateral insulating layers 140 and separated from the leading 134 and trailing 136 shields by conductive cap and seed electrode layers, respectively. The magnetoresistive stack 132 may be configured in a variety of different manners to sense data from an adjacent data storage medium. For example, the magnetoresistive stack 132 may be a trilayer lamination without a fixed magnetization, a lateral spin valve, or an abutted junction lamination with a fixed magnetization structure 142 separated from a magnetically free layer 144 by an resonant tunnel structure 146, as shown.

Decreasing the shield-to-shield spacing (SSS) 148 of the data reader 130 can increase data bit linear resolution, but can correspond with degraded magnetoresistance ratios that make reliable data sensing difficult in high linear data bit density environments. That is, a smaller SSS 148 can decrease the physical size of the various layers of the magnetoresistive stack 132 and the magnetic ratio between the free 144 and reference 142 portions of the stack 132. Configuring the tunnel structure 146 with a single barrier layer may reduce the SSS 148, but can have narrow operating parameters, such as magnetoresistance ratio, that is not conducive to high linear data bit density data storage environments.

Figure 3A:
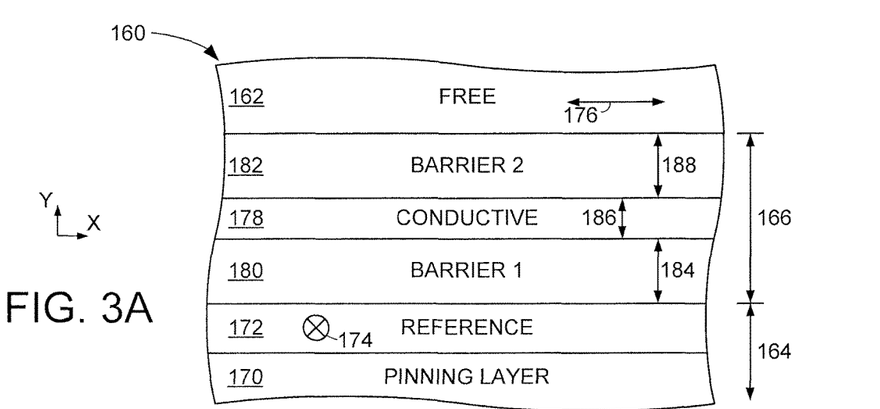
FIGS. 3A and 3B respectively show structural and operational data for example data readers configured in accordance with some embodiments.
Figure 3B:
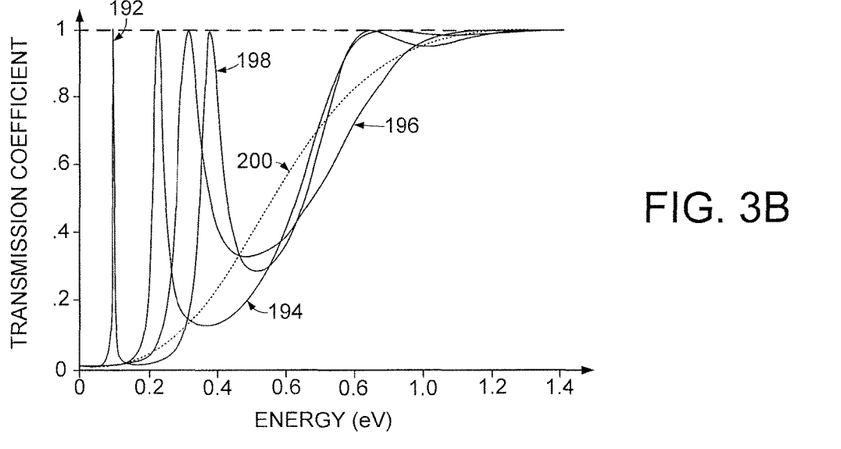

FIGS. 3A and 3B respectively show structural and operational portions of an example data reader 160 configured in accordance with various embodiments to provide optimized balance between size and data bit sensitivity. FIG. 3A provides a block representation of a portion of a magnetoresistive stack that has a magnetically free layer 162, or layers, separated from a fixed magnetization structure 164 by a tunnel structure 166. The fixed magnetization structure 164 may be one or more magnetic and non-magnetic layers, such as an antiferromagnetic pinning layer 170 contacting a magnetic reference layer 172, as shown, or as part of a synthetic antiferromagnetic lamination, to provide a magnetization 174 that is fixed in a predetermined direction and is not sensitive to external magnetic fields.

The tunnel structure 166 may be configured to be one or more different layers that provide a magnetoresistance ratio in comparison of a free magnetization 176 to the fixed magnetization 174. While a tunnel barrier can be configured of any number of materials and layers, the use of a single tunnel barrier layer can have small tunneling magnetoresistance ratios (TMR) that restrict tunneling current through the data reader 160. In the example embodiment of FIG. 3A, the tunnel structure 166 consists of a spacer layer 178 disposed between first 180 and second 182 tunnel barrier layers. It is noted that the spacer layer 178 is not limited to a non-magnetic metal material and can be constructed of a diverse variety of materials, such as magnetic metals, heusler alloys, and semiconductors. It is contemplated that the tunnel barrier layers 180 and 182 are similar or dissimilar materials that allows for increased tunneling current through the data reader 160.

The ability to tune the tunnel structure 166 for shape and composition can induce the formation of a quantum-confined discrete energetic state in the spacer layer 178 that optimizes tunneling current and TMR in the data reader 160. For instance, the respective thicknesses 184, 186, and 188 of the conductive 178, first barrier 180, and second barrier 182 layers, as measured along the Y axis parallel to an air bearing surface, can be tuned to resonant tunneling in the tunnel structure 166. The utilization of separated barrier layers 180 and 182 forms a quantum well with at least one confined energy state. That is, the well thickness and practical material limitations, like atomic spacing, act to form a quantum well.

At a predetermined bias value, the confined energy state, which can be characterized as a sub-band, aligns with an electrode energy level, or electrode Fermi level, of the data reader 160 and provides complete electronic transparency of both barrier layers 180 and 182 to incident electron flux to maximize current transmission through the tunnel structure 166. That is, transparency occurs when energy in the quantum well aligns with the Fermi level of an adjacent lead. Such transparency can optimize the transmission of current through the tunnel structure 166 by leveraging resonant tunneling to increase conductance inside the spacer layer 178.

FIG. 3B plots operational data for various configurations of the tunnel structure 166 in terms of incident electron energy compared to transmission coefficient of current through the tunnel structure 166 in an equilibrium state. The data of FIG. 3B relates to a common first and second barrier layer thickness of 1 nm. Line 192 depicts a spacer layer thickness 184 of 2 nm while line 194 corresponds with a spacer layer thickness of 1.5 nm. Lines 192 and 194 compare to lines 196 and 198 that respectively correspond with spacer layer thicknesses of 1.3 nm and 1.1 nm. Segmented line 200 represents a single barrier layer tunnel structure.

It can be appreciated from the exemplary data of FIG. 3B that the separation distance of the barrier layers 180 and 182 provided by the spacer layer thickness 184 can tune the barrier width of the tunnel structure 166 and optimize current transmission. The tuned configuration of the spacer layer 178 for material, such as an electrically conductive metallic material, and thickness 184 can provide a resonant state at a predetermined energy. In other words, tuning the material and size of the spacer layer 178 can provide optimized current transmission through the data reader for a particular barrier energy value, such as, but not limited to, 0.4 eV.

Although configuring the tunnel structure 166 with a spacer layer 178 and multiple barrier layers 182 and 184 can increase intrinsic TMR, the SSS of the data reader can be increased, such as by 3 nm. Hence, the tuned configuration of the constituent aspects of the tunnel structure 166 can provide optimized data reading sensitivity and performance by balancing increased TMR values with slightly larger SSS. By tuning the tunnel structure 166 to utilize resonant tunneling, the detrimental effect on performance due to large SSS can be mitigated by relatively large increases in TMR and current transmission, which can increase robustness of the data reader 160.

Figure 4A:
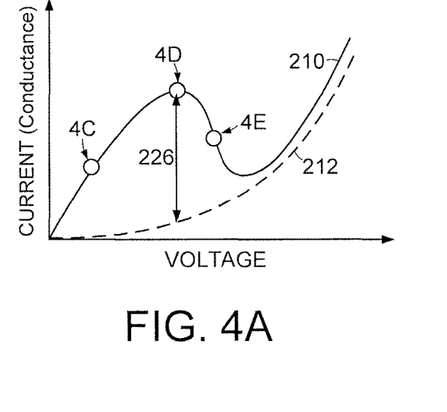
FIGS. 4A-4E respectively illustrate assorted operational data for example data readers configured in accordance with various embodiments.
Figure 4B:
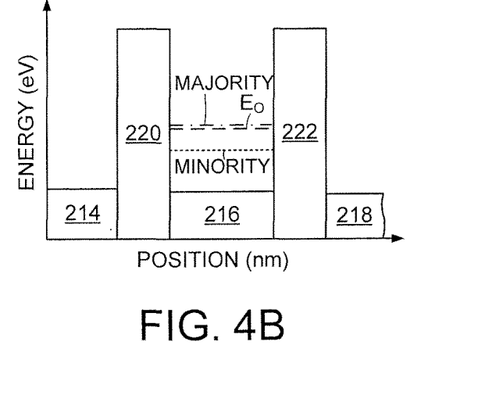

FIGS. 4A-4E respectively depict assorted operational data associated with a tuned tunnel structure, such as the tunnel structure 166 of FIG. 3A. FIG. 4A illustrates the relationship of current to voltage for a tuned tunnel structure in line 210 compared to a single barrier layer in line 212. When a data reader is in an equilibrium state, as shown by FIG. 4B, first 214, second 216, and third 218 potentials respectively corresponding to free, conductive, and reference layers are at approximately the same value. Barrier potentials 220 and 222 are at approximately the same value, have a consistent potential through their thickness, and correspond to first and second barrier layers of a tunnel structure.

Figures 4C, 4D:
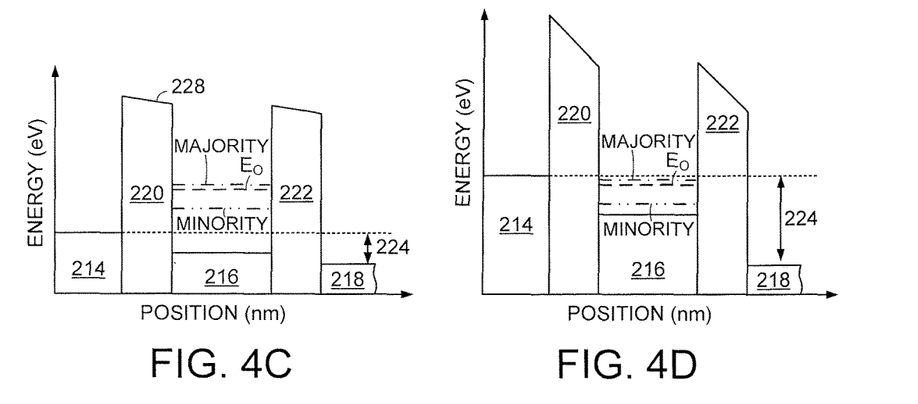

FIG. 4C represents a low bias state for a data reader where a difference in the first 214 and third 218 potentials, as quantified by difference 224, alters the potential of each barrier to create a gradient along its thickness. The low bias state of FIG. 4C has the first potential 214 lower than the resonant energy value ($E_O$) of the tunnel structure, which increases conductance of across the tunnel structure, as shown in FIG. 4A, but does not greatly increase current conduction. FIG. 4D illustrates a high bias state for a data reader where the first potential 214 is greater than the optimal energy value and produces increased conductance, as shown in FIG. 4A, but does not result in a resonant tunneling condition.

Figure 4E:
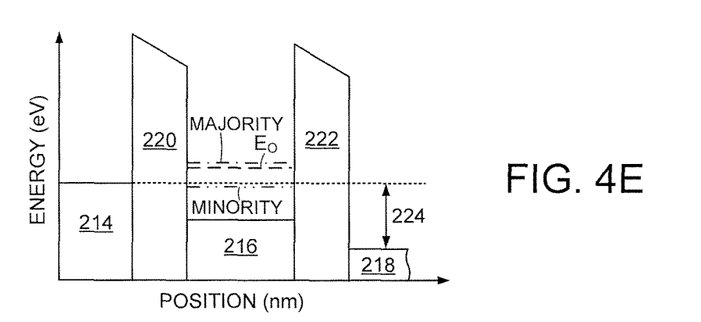

FIG. 4E displays a resonant bias condition where the first potential 214 is approximately the resonant energy value that provides a conductance boost 226, as shown in FIG. 4A. It can be appreciated that a bias between the first 214 and third 218 potentials, as depicted by difference 224, can produce changing barrier energy heights through the respective barrier layer thicknesses, as shown by the tilt of line 228. Hence, a biased data reader condition produces asymmetrical confinement energy and variable sub-band energy for applied voltages that can impede current transmission through a tunnel structure.

Figure 5A:
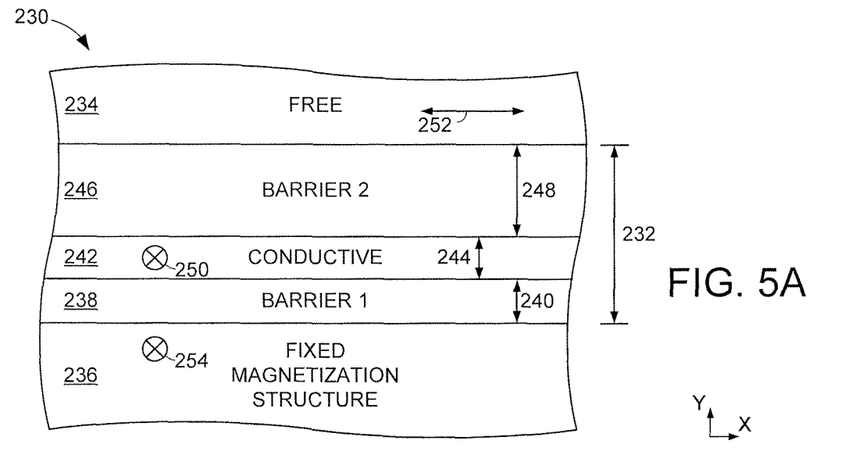
FIGS. 5A-5C respectively display structural and operational data for example data readers arranged in accordance with some embodiments.
Figure 5B:
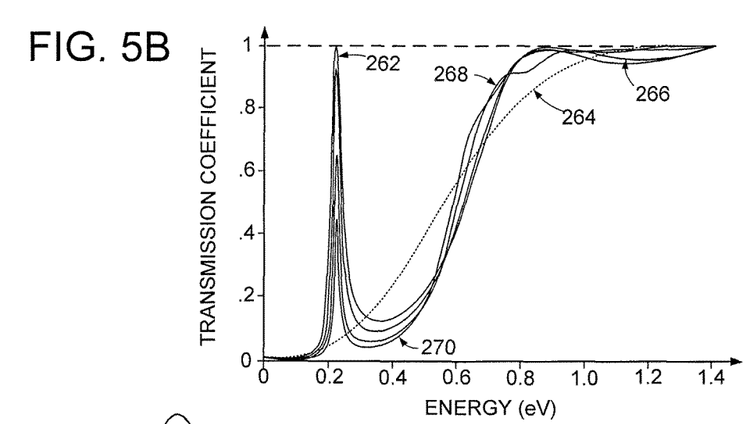

FIGS. 5A and 5B respectively display structural and operational portions of an example data reader 230 that controls asymmetrical confinement energy in accordance with various embodiments. In FIG. 5A, a magnetoresistive stack has an asymmetrical tunnel structure 232 disposed between a magnetically free structure 234 and a fixed magnetization structure 236. The resonant tunnel structure 232 has first barrier layer 238 that has a thickness 240 measured along the Y axis, a spacer layer 242 with a thickness 244 along the Y axis, and a second barrier layer 246 with a thickness 248 along the Y axis.

In accordance with some non-limiting embodiments, the first 238 and second 246 barrier layers are each constructed of MgO while the first thickness 240 is smaller than the third thickness 248. The different thicknesses 240 and 248 can be characterized as an asymmetric configuration with respect to the X axis that compensates for asymmetric biased confinement energy, as illustrated by FIGS. 4C-4E. The thickness 244 of the spacer layer 242 may be the same as, smaller than, or larger than the first thickness 240 while being smaller than the second thickness 248. The ability to tune the thicknesses 240, 244, and 248 allows the resonant tunnel structure 232 to provide a quantum-confined discrete energetic state in the spacer layer 242 that results in resonant tunneling for a variety of different energy barrier heights at different bias voltages.

In comparison to the symmetric (same thickness) barrier layers of FIG. 3A that is biased at resonance and has a second barrier potential that is lowered and no longer at 100% current transmission, the asymmetric barrier layers 248 and 246 maximizes current transmission under bias conditions and at resonant tunneling. Various embodiments configure the spacer layer 242 to be magnetic and have a magnetization 250 that is either fixed by the fixed magnetization structure 236 or magnetically free to rotate in response to external data bits. Other non-limiting embodiments configure the spacer layer to be non-magnetic and serve to establish a location for confinement of energy and resonant tunneling.

Although not required or limiting, the materials of the conductive 178 and barrier layers 180 and 182 can be selected, in various embodiments, of: metals, semi-metals, half-metals, monatomic semiconductors, compound semiconductors, dilute magnetic semiconductors, narrow through wide bandgap semiconductors, insulators, monochalcogenides, such as Mo alloys, Ti alloys, and W alloys. The ability to tune the various layers of the tunnel structure 232 to combinations of similar and dissimilar materials can provide a resonant-tunneling data reader 230. Further in a non-limiting example, a MgO barrier layer materials are separated by a $CoFe_{20}B$ spacer layer and tuned for thickness, such as 7.2-9.0 Å A to provide resistance areas from 0.7-1.8.

The orientation of a spacer layer magnetization 250 can be aligned with the free magnetization 252 along the X axis or aligned with the fixed magnetization 254 along the Z axis. Regardless of the configuration of the spacer layer 242, all embodiments enhance data reader TMR when the magnetoresistive stack is biased at resonance. FIG. 5B graphs resonant current transmission in relation to barrier energy for various second barrier layer thicknesses 248. It is noted that the data in FIG. 5B corresponds with a 1 nm first barrier layer thickness 240 and a 1.3 nm spacer layer thickness 244.

Figure 5C:
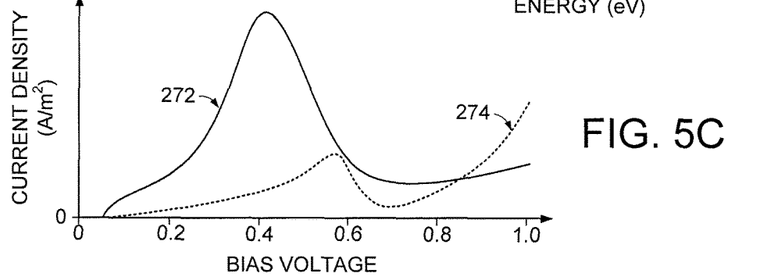

Line 262 corresponds with some data of FIG. 3B due to the common thicknesses of the barrier layers and serves as a baseline along with segmented line 264 that represents a single barrier layer tunnel structure to compare the asymmetrical tunnel structure 262 shown in FIG. 5A. Line 266 corresponds with a 1.2 nm second barrier layer thickness while line 268 represents a 1.5 nm second barrier layer thickness and line 270 corresponds with a 1.7 nm second barrier layer thickness. It can be appreciated from lines 266, 268, and 270 that the barrier energy and resonant tunneling condition can be controlled by tuning the thickness of the second barrier layer in view of the first barrier layer and spacer layer thicknesses. Solid line 272 of FIG. 5C illustrates how a bias voltage of 0.4 V corresponds with a spike in current density while segmented line 274 displays how a lower overall current density and current density spike is achieved at 0.6 V.

Figure 6:
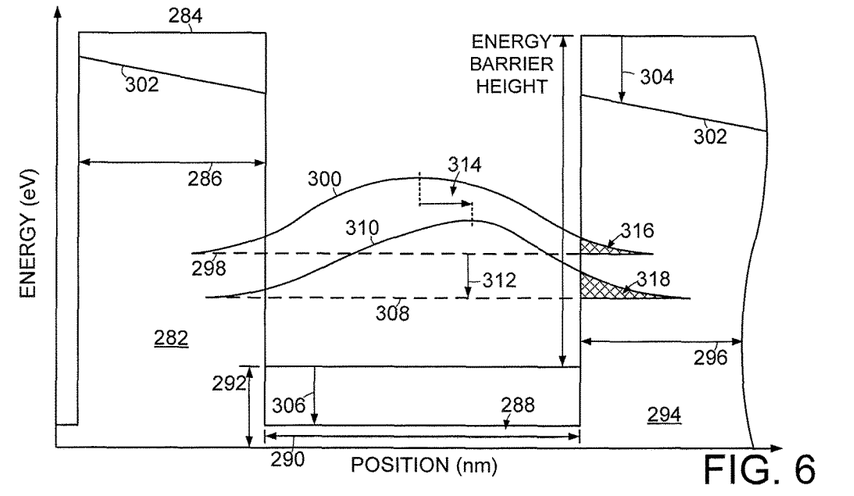
FIG. 6 is an operational diagram for an example data reader utilized in accordance with assorted embodiments.

FIG. 6 displays non-limiting operational data corresponding with an resonant tunnel structure tuned in accordance with some embodiments. A first barrier layer is represented by region 282 and has uniform barrier energy at equilibrium, as shown by line 284, and a thickness 286. A spacer layer is represented by region 288 that has a thickness 290 and equilibrium energy 292. The resonant tunnel structure has a second barrier layer that is represented by region 294 that has a thickness 296 and barrier energy at equilibrium that substantially matches the first barrier layer 282.

At equilibrium, a sub-band energy state is present, as represented by line 298, and the effective barrier energy across the spacer layer is variable, as shown by line 300. When the magnetoresistive stack is biased, the barrier energies of the barrier layers, as depicted by lines 302, and spacer layer are lowered by predetermined amounts 304 and 306, respectively. The tuned configuration of the resonant tunnel structure alters the sub-band energy state potential to state 308 and effective barrier energy 310. For example, the energy sub-band is lowered by amount 312 and the position of the greatest sub-band barrier energy is moved by amount 314.

Bias voltage is partitioned between the barrier layers 282 and 294, which leads to a shift in electron probability and an increased evanescent tail volume within the second barrier layer. Tail regions 316 and 318 respectively show how making the second barrier layer thickness 296 greater than the first barrier layer thickness 286 increases the probability of resonant tunneling. Hence, physical asymmetry of the barrier layer thicknesses leas to tunneling symmetry under bias conditions. Through the tuning of the resonant tunnel structure, TMR is increased, such as from 31% with a single barrier layer to 57% with a dual barrier layers employing resonant tunneling.

As can be appreciated from FIG. 6, the transmission coefficient T(E), through a tuned resonant tunnel structure is maximized when transmission probability is equivalent for both barriers. Under a voltage bias, the double-barrier structure becomes asymmetric in energy. Therefore, in order to maximize transmission across the tunnel structure when the structure is biased, the energy barriers are tuned to be asymmetric in thickness in order to maintain equivalent transmission probability between both barriers. In other words, the second barrier layer thickness 286 is tuned to be less than the first barrier layer thickness 296 to provide quantum load matching in the resonant tunnel structure.

Figure 7A:
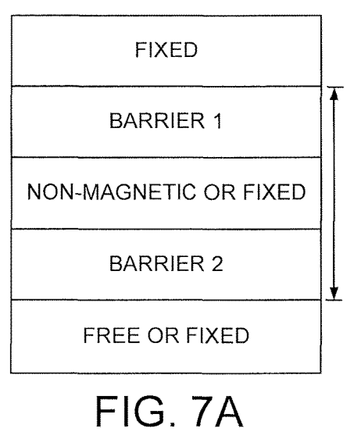
FIGS. 7A and 7B respectively show block representations of portions of an example data reader configured in accordance with some embodiments.
Figure 7B:
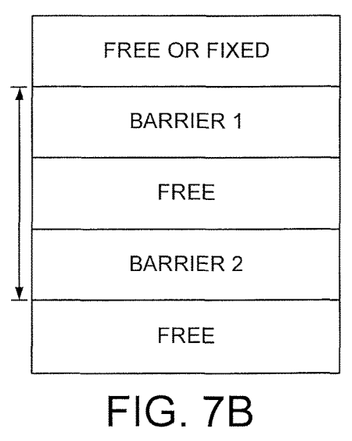

Assorted embodiments configure the various layers of an resonant tunnel structure to be ferromagnetic, non-magnetic, and/or semiconducting analogs. Such material tuning can maximize data reading performance, such as by enhancing TMR and increasing signal-to-noise ratio while increasing reader stability, such as by reducing barhausen jumps and glitches. The ability to select magnetic and non-magnetic materials for the resonant tunnel structure further allows a data reader to have any number of magnetically free and magnetically fixed structures. As a non-limiting example, the conductive 288, first barrier 282, and second barrier 294 layers can each be a magnetically free, magnetically fixed, or non-magnetic structure, as illustrated by FIGS. 7A and 7B.

Figure 8:
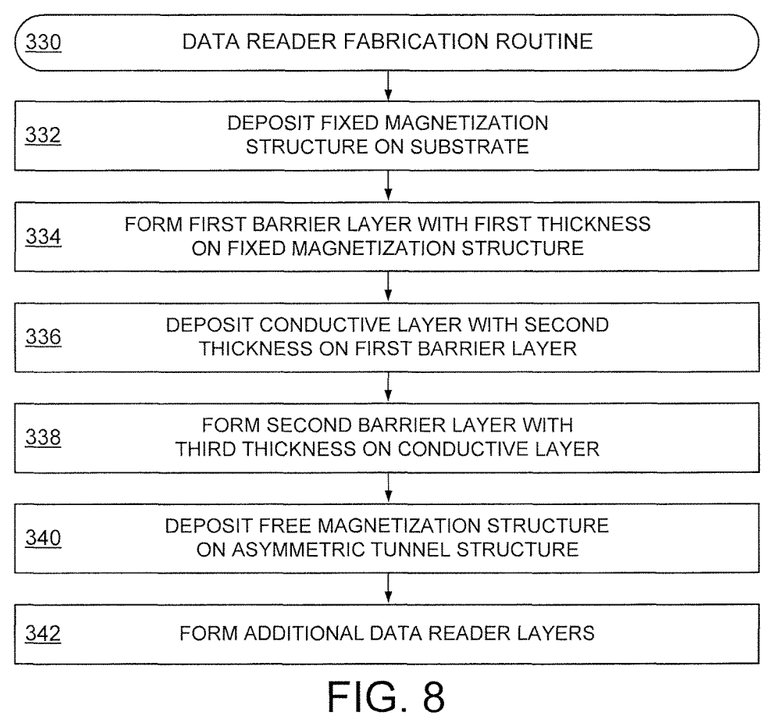
FIG. 8 plots an example data reader fabrication routine carried out in accordance with various embodiments.

FIG. 8 is a flowchart of an example data reader fabrication routine 330 that is carried out in accordance with various embodiments. The routine 330 begins by depositing a fixed reference structure onto a substrate in step 332. The fixed reference structure may have one or more magnetic and non-magnetic layers of similar or dissimilar materials. The fixed reference structure may be subsequently processed, such as through annealing, to provide a magnetization orientated in a predetermined direction and resistant to alteration by external data bits. The substrate in step 332 may be any material, such as glass or a transition metal material, and any purpose, such as a seed, shield, or temporary layer.

Step 334 proceeds to form a first barrier layer of MgO onto the fixed magnetization reference layer, which can be a magnetic material like CoFeB. The first barrier layer is formed with a uniform thickness that provides a predetermined barrier energy, such as 0.4 eV. Next, a spacer layer is deposited in step 336 with a thickness and material that promotes the formation of a quantum-confined discrete energy state in the spacer layer. A second barrier layer of MgO is subsequently formed in step 338 atop the spacer layer with a thickness that is greater than the thickness of the first barrier layer. The thicknesses of the conductive and barrier layers are respectively tuned in steps 334, 336, and 338 to provide resonant tunneling that maintains a transmission coefficient of 1.

Step 340 proceeds to deposit a free magnetization structure on the second barrier layer. The free magnetization structure may be one or more magnetic and non-magnetic layers that are collectively sensitive to external data bits. One or more shield and electrode layers, such as side shields, trailing shield, and a cap, can subsequently be formed on the free structure to complete the data reader in step 342. It is noted that although the routine 330 positions the fixed magnetization structure in contact with the thinner first barrier layer and the free magnetization structure in contact with the larger second barrier layer, such configuration is not required or limiting and the free magnetization structure can be positioned in contact with the first barrier layer in various embodiments.

Through the tuned configuration of a tunnel structure to have asymmetric barrier layer thicknesses, an optimized tunneling current can be achieved under specified bias conditions due to energy-matching of lead energy and generation of a quantum-confined energy level positioned in the spacer layer. The presence of at least two barrier layers and a metallic spacer layer that are respectively tuned for thickness and tunneling transparency can provide unimpeded current transmission through the tunnel structure. Such an resonant tunnel structure provides the ability to tune the resistance area of a data reader in-situ via voltage articulation while decoupling the free magnetization from the fixed magnetization due to increase total barrier thickness.

It is to be understood that even though numerous characteristics of various embodiments of the present disclosure have been set forth in the foregoing description, together with details of the structure and function of various embodiments, this detailed description is illustrative only, and changes may be made in detail, especially in matters of structure and arrangements of parts within the principles of the present technology to the full extent indicated by the broad general meaning of the terms in which the appended claims are expressed. For example, the particular elements may vary depending on the particular application without departing from the spirit and scope of the present disclosure.

What is claimed is:

1. An apparatus comprising a data reader having a resonant tunnel structure disposed between first and second magnetic structures, the resonant tunnel structure comprising a spacer layer disposed between first and second barrier layers having different thicknesses measured along a common plane, the first barrier layer having a 1 nm thickness, the spacer layer comprising $CoFe_{20}B$ and having a 1.3 nm thickness, the resonant tunnel structure having a current transmission coefficient of at least 0.4 with the second barrier layer having a barrier energy of approximately 0.2 eV.

2. The apparatus of claim 1, wherein the first barrier layer has a first thickness and the second barrier layer has a second thickness, the first thickness being smaller than the second thickness.

3. The apparatus of claim 2, wherein the first thickness is 1 nm, the second thickness is less than 2 nm, and a third thickness of the spacer layer is 1.3 nm along the common plane.

4. The apparatus of claim 1, wherein the spacer layer is a metallic material.

5. The apparatus of claim 1, wherein the spacer layer is a non-magnetic material.

6. The apparatus of claim 1, wherein the first magnetic structure is fixed to a magnetic orientation by a pinning layer.

7. The apparatus of claim 1, wherein the different thicknesses of the first and second barrier layers correspond to bias-dependent resonant tunneling between the first and second magnetic structures.

8. The apparatus of claim 1, wherein the first and second barrier layers each comprise MgO and the spacer layer comprises a transition metal material.

9. The apparatus of claim 1, wherein the common plane is parallel to an air bearing surface (ABS).

10. The apparatus of claim 1, wherein the second magnetic structure is magnetically free and sensitive to an external magnetization.

11. An apparatus comprising:
    a data reader having a resonant tunnel structure disposed between first and second magnetic structures, the resonant tunnel structure comprising a first barrier layer having a first thickness, a second barrier layer having a second thickness, and a spacer layer having a third thickness, the spacer layer disposed between the first and second barrier layers, the first, second, and third thicknesses being different and each measured along a common plane, the first barrier layer having a 1 nm thickness, the spacer layer comprising $CoFe_{20}B$ and having a 1.3 nm thickness, the resonant tunnel structure having a current transmission coefficient of at least 0.4 through the resonant tunnel structure with the second barrier layer having a barrier energy of approximately 0.2 eV;

a data storage medium separated from the data reader by an air bearing; and a data bit stored in the data storage medium.

12. The apparatus of claim 11, wherein the third thickness is less than the second thickness and greater than the first thickness.

13. The apparatus of claim 11, wherein the first barrier layer contacts the first magnetic structure, the first magnetic structure having a fixed magnetization.

14. The apparatus of claim 11, wherein the second barrier layer contacts the second magnetic structure, the second magnetic structure is magnetically free and sensitive to the data bit.

15. The apparatus of claim 11, wherein the data reader is disposed between first and second magnetic shields.

16. The apparatus of claim 11, wherein the spacer layer has a first magnetization direction oriented orthogonally to a second magnetization direction of the first magnetic structure.

17. The apparatus of claim 11, wherein the spacer layer is magnetically free and sensitive to the data bit.

18. A method comprising:

disposing a resonant tunnel structure of a data reader between first and second magnetic structures, the resonant tunnel structure comprising a spacer layer disposed between first and second barrier layers having different thicknesses measured along a common plane, the first barrier layer having a 1 nm thickness, the spacer layer comprising $CoFe_{20}B$ and having a 1.3 nm thickness, the first, second, and third thicknesses collectively provide a resonant state through the resonant tunnel structure at barrier energy for the second barrier layer of approximately 0.2 eV;

maintaining the resonant state and a current transmission coefficient of at least 0.4 through the resonant tunnel structure while the data reader is biased; and passing a current through the data reader to sense a data bit stored on an adjacent data storage medium.

19. The method of claim 18, wherein the different thicknesses of the first and second barrier layers produce bias-dependent resonant tunneling through the resonant tunnel structure.

20. The method of claim 19, wherein the bias-dependent resonant tunneling has a transmission coefficient of 1 at a bias voltage of 0.4 V applied between the first and second magnetic structures.

* * * * *